April 18, 1933.  J. E. HOGUE  1,903,764
ICE CREAM OR CONFECTION CONTAINER
Filed Sept. 2, 1931

Inventor
J. E. Hogue

By Clarence A. O'Brien
Attorney

Patented Apr. 18, 1933

1,903,764

UNITED STATES PATENT OFFICE

JAMES EARL HOGUE, OF HOT SPRINGS, ARKANSAS

ICE CREAM OR CONFECTION CONTAINER

Application filed September 2, 1931. Serial No. 560,822.

This invention relates to a container for ice cream, confections, etc., the general object of the invention is to provide the ice cream manufacturer with an inexpensive container which can be easily and quickly filled, and in which he can deliver or store, his novelty frozen confections, and to provide the retailer (drug stores, soda fountains and all sales agencies for such articles) with a container which affords the utmost convenience in handling, reducing the cost and simplifying the problem of storage and refrigeration.

Another object is to eliminate all loss from crushing or breakage by protecting the contents from damage in any position. Also, to provide a container in which the contents can be kept free from contamination and deterioration.

Another object is to provide a container in which the contents can be served at a fountain or curb without the use of additional equipment such as napkins, trays, etc.

Still another object is to provide a container which provides perfect sanitation to the consumer while handling, or while eating the confection from the container, and to prevent the hands or clothing of the consumer from being soiled by broken bits of chocolate or melted ice cream while eating the confection and which can be thrown away or easily disposed of, after the contents are used.

Also to provide a container which has a novel and efficient method of operation, the appearance of which has great sales appeal to stimulate the sale of such confections as the container may hold.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 3:
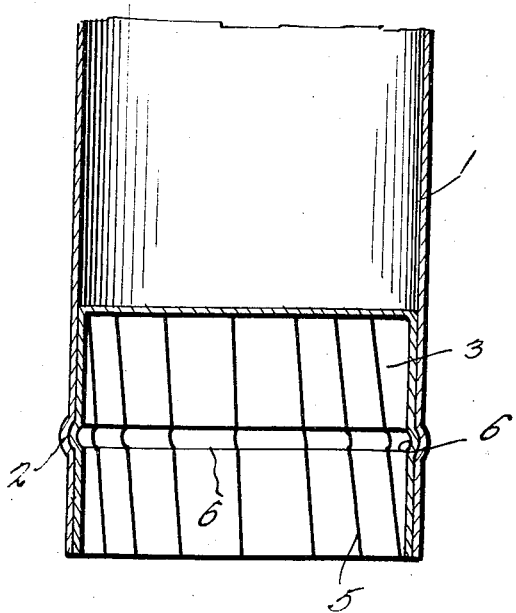
Fig. 3 is an enlarged sectional view through one end of the container.
Figure 5:
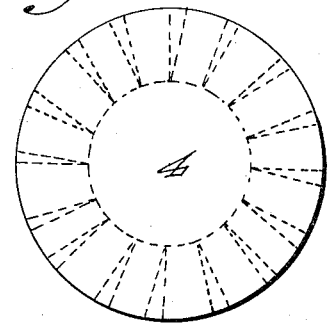
Fig. 5 is a view of the blank from which the cap is formed.

In this drawing, the container 1 is of cylindrical shape and is formed with an annular rib 2 adjacent each end thereof, these ribs being formed by interior grooves. A cap 3 is inserted in each end of the container, the caps being of cup shape, and are placed in inverted position in the container as shown in Fig. 3. Each cap is formed of a circular blank of material shown at 4 in Fig. 5 with its edges crimped or folded as shown at 5, so as to provide a flange for the cap. The flange is formed with a rib 6 which when the cap is in place will engage the groove in the container as shown in Fig. 3. As shown, the rib 6 on each cap is formed by an internal groove in the flange of the cap.

Figure 1:
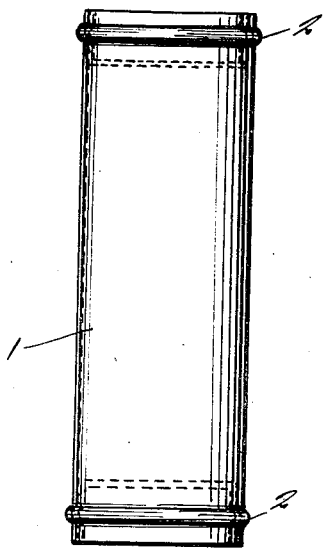
Figure 1 is an elevation of the invention.
Figure 2:
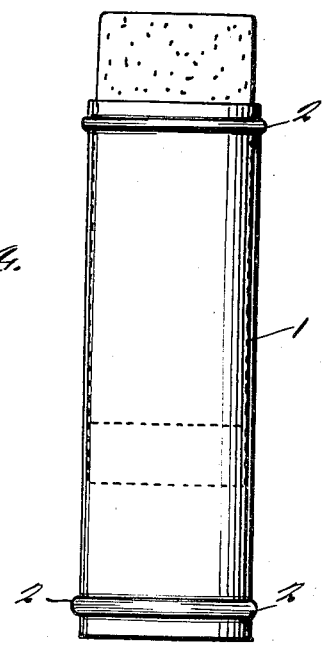
Fig. 2 is a similar view but showing the contents partly pushed therefrom.
Figure 4:
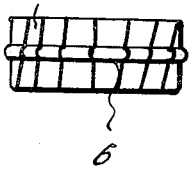
Fig. 4 is a side view of the cap.

Thus it will be seen that the two caps are retained in the container by friction as well as the ribs 6 thereon engaging the grooves in the container, and when it is desired to secure access to the contents, it is simply necessary to press upon one of the caps so as to move it towards the opposite end of the container, and the resultant pressure on the contents will force the other cap from the container and project some of the contents as shown in Fig. 2. Thus the projected part of the contents can be eaten and then the cap can be given another push and project another part of the contents, and this is kept up until all the contents is consumed.

It will of course be understood that if the contents are to be placed on a plate or the like, the pressure on one of the caps is continued until the contents are entirely projected from the container.

The caps and the container are preferably made of water-proof paper or the like so that the cost of manufacture will be lowered to make it profitable to use the container to dispense ice cream and other low cost commodities.

The caps or closures, when in place, hold against pressure in any direction (inside pressure or outside pressure) but, when pressure is applied on either cap greater than the locks are built to withstand, the lock gives away so that the cap telescopes through the tube, the resultant pressure on the contents forcing the opposite cap out, allowing the contents to be expelled at the will of the consumer. This action is made possible by the flexibility of the flanges on the closure or cap and the ridge around the flange. The lock gives way without damage to the cap or closure, by the flexible flange bending slightly in when pressure is applied, so that the ridge or rib can slip out of the groove and move through the tube; the ridge or rib around the flange, being the greatest circumference of the closure, if expanded or pressed against the wall of the tube, giving the smallest possible surface for friction (which lets it move more easily) and forms a watertight closure, while stationary at any point in the tube or while traveling through the tube, thereby accomplishing the result of a container for the purposes aforementioned.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention what I claim as new is:—

1. A container of the class described comprising a hollow body having its ends opened with an interior annular groove in each end part, a pair of cup-shaped caps provided with flexible flanges fitting in the ends of the container with their open ends outermost, each cap having an exterior annular rib on its flange, formed by an interior annular groove in the flange, for engaging a groove in the container, the flexibility of the flange enabling a cap to be pushed into the container to cause the contents thereof to force the other cap from the container, after which the contents will be forced from the container.

2. A container of the class described comprising a cylindrical body having both ends open and formed of water-proof paper or the like, and a pair of caps of cup-shape closing the ends of the container, and fitting therein with their open ends outermost, each cap being formed of a circular blank of water-proof paper or the like having its edges crimped or folded to form flat pleats to provide an annular flexible flange, the end parts of the container having interior annular grooves therein forming exterior ribs and the flanges of the caps having interior grooves therein forming exterior annular ribs thereon to engage the grooves of the body, the flexibility of the flange of a cap enabling the cap to be pushed into the body to cause the contents thereof to force the other cap from the body, after which the contents will be forced from the body.

In testimony whereof I affix my signature

JAMES EARL HOGUE.